United States Patent
Mikami

(10) Patent No.: US 11,716,554 B2
(45) Date of Patent: Aug. 1, 2023

(54) SOLID-STATE IMAGING DEVICE AND METHOD FOR DRIVING THE SAME, AND ELECTRONIC APPARATUS

(71) Applicant: Sony Group Corporation, Tokyo (JP)

(72) Inventor: Takuya Mikami, Tokyo (JP)

(73) Assignee: Sony Group Corporation, Tokyo (JP)

( * ) Notice: Subject to any disclaimer, the term of this patent is extended or adjusted under 35 U.S.C. 154(b) by 7 days.

(21) Appl. No.: 17/627,036

(22) PCT Filed: Jul. 10, 2020

(86) PCT No.: PCT/JP2020/026971
§ 371 (c)(1),
(2) Date: Jan. 13, 2022

(87) PCT Pub. No.: WO2021/014999
PCT Pub. Date: Jan. 28, 2021

(65) Prior Publication Data
US 2022/0256108 A1 Aug. 11, 2022

(30) Foreign Application Priority Data
Jul. 24, 2019 (JP) .................. 2019-136102

(51) Int. Cl.
*H04N 25/71* (2023.01)
*H04N 25/75* (2023.01)
(Continued)

(52) U.S. Cl.
CPC .......... *H04N 25/75* (2023.01); *H04N 25/531* (2023.01); *H04N 25/77* (2023.01)

(58) Field of Classification Search
None
See application file for complete search history.

(56) References Cited

U.S. PATENT DOCUMENTS

| 2009/0021612 A1 | 1/2009 | Hamilton, Jr. |
| 2014/0049675 A1 | 2/2014 | Takatsuka et al. |

(Continued)

FOREIGN PATENT DOCUMENTS

| EP | 2800376 A1 | 11/2014 |
| EP | 2858348 A1 | 4/2015 |

(Continued)

OTHER PUBLICATIONS

International Search Report dated Oct. 13, 2020 in PCT/JP2020/026971 filed on Jul. 10, 2020, 2 pages.

*Primary Examiner* — Mark T Monk
(74) *Attorney, Agent, or Firm* — Oblon, McClelland, Maier & Neustadt, L.L.P.

(57) ABSTRACT

The present technology relates to a solid-state imaging device, method for driving the same, and electronic apparatus capable of avoiding an occurrence of a blackout in low-speed read-out.
The solid-state imaging device includes a pixel array unit in which a plurality of pixels is two-dimensionally arranged in a matrix, and a control unit that exposes all pixels of the pixel array unit at a same exposure timing and performs thinned read-out 2(N−1) times in which all the pixels are thinned to 1/N, so as to read electric charge in all the pixels of the pixel array unit, the electric charge being generated at the same exposure timing. The present technology can be applied to, for example, a solid-state imaging device, or the like, incorporated in an imaging device.

10 Claims, 12 Drawing Sheets

(51) Int. Cl.
*H04N 25/77* (2023.01)
*H04N 25/531* (2023.01)

(56) References Cited

U.S. PATENT DOCUMENTS

2014/0233100 A1* 8/2014 Sato .................. G02B 27/0172
359/463
2020/0021739 A1 1/2020 Tanaka et al.

FOREIGN PATENT DOCUMENTS

| JP | 2009-49870 A | 3/2009 |
| JP | 2014-39159 A | 2/2014 |
| WO | WO 2018/179711 A1 | 10/2018 |

\* cited by examiner

FIG. 12

| DISPLAYED FRAME RATE OF LIVE VIEW IMAGE [fps] | READ-OUT SPEED REQUIRED BY FIRST DRIVING METHOD [fps] | READ-OUT SPEED REQUIRED BY SECOND DRIVING METHOD [fps] | READ-OUT SPEED REQUIRED BY THIRD DRIVING METHOD [fps] (IN CASE OF 1/5 THINNED READ-OUT) |
|---|---|---|---|
| 30 | 30 | 60 | 12 |
| 60 | 60 | 120 | 24 |
| 120 | 120 | 240 | 48 |

SOLID-STATE IMAGING DEVICE AND METHOD FOR DRIVING THE SAME, AND ELECTRONIC APPARATUS

TECHNICAL FIELD

The present technology relates to a solid-state imaging device, a method for driving the same, and an electronic apparatus, and more particularly to a solid-state imaging device, method for driving the same, and electronic apparatus capable of avoiding an occurrence of a blackout in low-speed read-out.

BACKGROUND ART

With an imaging device such as a digital single-lens camera or a compact digital camera, for example, a user checks an image displayed on a display unit such as an LCD or an electric viewfinder (EVF), determines an image capturing timing, and captures an image by pressing a release button (shutter button). The image displayed on the display unit at this time is called a live view image, a through image, or the like. There may be a case where a phenomenon of what is called a blackout occurs in the imaging device, in which a live view image is not displayed on the display unit due to exposure preparation processing starting by the release button being pressed.

In order to avoid an occurrence of a blackout, for example, there is a configuration in which an image for display stored in a frame memory is displayed on a display unit until display of an image for recording is enabled (refer to Patent Document 1, for example).

CITATION LIST

Patent Document
Patent Document 1: WO 2018/179711

SUMMARY OF THE INVENTION

Problems to be Solved by the Invention

Although the occurrence of the blackout can be avoided by increasing image read-out speed, a circuit for high-speed read-out increases in scale and power consumption also increases.

The present technology has been developed to solve such a problem mentioned above and to enable avoidance of an occurrence of a blackout by using low-speed read-out.

Solutions to Problems

A solid-state imaging device according to a first aspect of the present technology includes a pixel array unit in which a plurality of pixels is two-dimensionally arranged in a matrix, and a control unit that exposes all pixels of the pixel array unit at the same exposure timing and performs thinned read-out 2(N−1) times in which all the pixels are thinned to 1/N, so as to read electric charge in all the pixels of the pixel array unit, the electric charge being generated at the same exposure timing.

A method for driving a solid-state imaging device according to a second aspect of the present technology includes, by the solid-state imaging device including a pixel array unit in which a plurality of pixels is two-dimensionally arranged in a matrix, exposing all pixels of the pixel array unit at the same exposure timing and performing thinned read-out 2(N−1) times in which all the pixels are thinned to 1/N, so as to read electric charge in all the pixels of the pixel array unit, the electric charge being generated at the same exposure timing.

An electronic apparatus according to a third aspect of the present technology includes a solid-state imaging device including a pixel array unit in which a plurality of pixels is two-dimensionally arranged in a matrix, and a control unit that exposes all pixels of the pixel array unit at the same exposure timing and performs thinned read-out 2(N−1) times in which all the pixels are thinned to 1/N, so as to read electric charge in all the pixels of the pixel array unit, the electric charge being generated at the same exposure timing.

According to the first to third aspects of the present technology, in the pixel array unit in which a plurality of pixels is two-dimensionally arranged in a matrix, all pixels of the pixel array unit are exposed at the same exposure timing, and thinned read-out is performed 2(N−1) times in which all the pixels are thinned to 1/N read-out, by which electric charge in all the pixels of the pixel array unit is read, the electric charge being generated at the same exposure timing.

The solid-state imaging device or the electronic apparatus may be an independent device or a module incorporated in another device.

BRIEF DESCRIPTION OF DRAWINGS

FIG. 12 is a diagram comparing read-out speeds of the first to third driving methods.

MODE FOR CARRYING OUT THE INVENTION

A mode for carrying out the present technology (hereinafter, referred to as an embodiment) will be described below. Note that the description will be made in the following order.

1. Configuration example of imaging device
2. Schematic configuration example of solid-state imaging device
3. Circuit configuration example of pixel
4. Comparative examples of achieving blackout free
5. Drive of solid-state imaging device <1. Configuration Example of Imaging Device>

Figure 1:
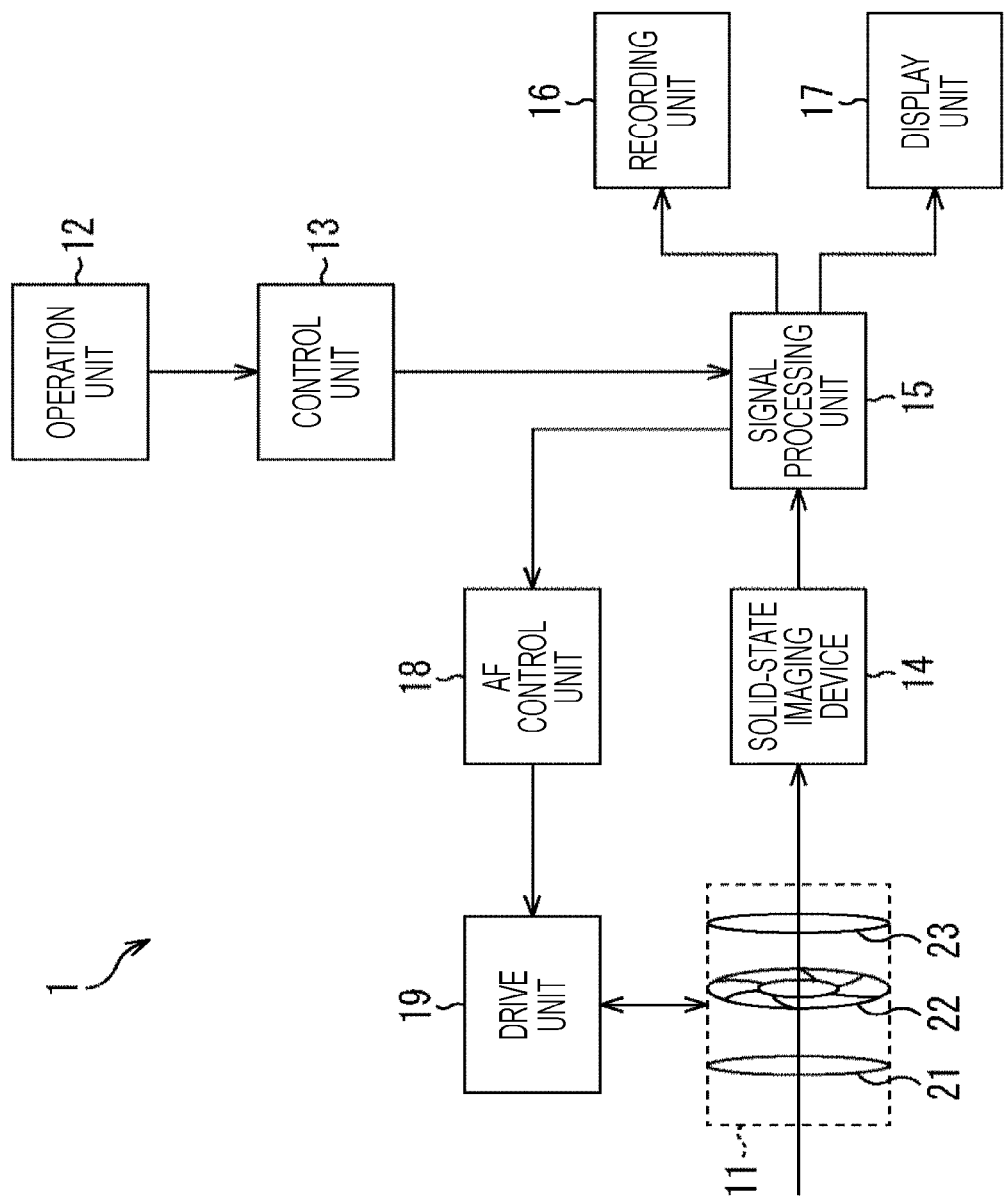
FIG. 1 is a block diagram illustrating an embodiment of an imaging device including a solid-state imaging device to which the present technology is applied.

FIG. 1 is a block diagram illustrating an embodiment of an imaging device including a solid-state imaging device to which the present technology is applied.

An imaging device 1 in FIG. 1 includes, for example, a digital single-lens camera, a compact digital camera, or the like, captures an image of a subject to generate the captured image, and records the captured image as a still image or a moving image. Hereinafter, it is assumed that a still image is mainly recorded.

The imaging device 1 includes a lens unit 11, an operation unit 12, a control unit 13, a solid-state imaging device 14, a signal processing unit 15, a recording unit 16, a display unit 17, an AF control unit 18, and a drive unit 19.

The lens unit 11 collects light from the subject (subject light). The subject light collected by the lens unit 11 is incident on the solid-state imaging device 14.

The lens unit 11 includes a zoom lens 21, a diaphragm 22, and a focus lens 23.

The zoom lens 21 moves in an optical axis direction by being driven by the drive unit 19 to vary a focal length and adjust a magnification of the subject included in the captured image. The diaphragm 22 changes a degree of aperture by being driven by the drive unit 19 to adjust an amount of subject light incident on the solid-state imaging device 14. The focus lens 23 moves in the optical axis direction by being driven by the drive unit 19 to adjust focus. Note that the zoom lens 21 may be omitted.

The operation unit 12 receives operation by a user. The user performs, for example, operation of changing an imaging mode, pressing a release button (not illustrated), or the like with the operation unit 12. For example, in a case where the release button is pressed, the operation unit 12 supplies the control unit 13 with an operation signal indicating that the release button has been pressed.

The control unit 13 controls operation of each of the units of the imaging device 1.

For example, in a case where the control unit 13 receives an operation signal indicating that the release button has been pressed, the control unit supplies the signal processing unit 15 with an instruction to record a still image. Furthermore, in a case where a live view image, which is a real-time image of a subject, is to be displayed on the display unit 17, the control unit 13 supplies the signal processing unit 15 with an instruction to generate the live view image.

Furthermore, in a case where in-focus judgment is to be performed, the control unit 13 supplies the signal processing unit 15 with an instruction to operate the in-focus judgment. Although examples of the focus control method include a contrast method, a phase-difference detection method, and the like, the focus control method is not limited.

The solid-state imaging device 14 photoelectrically converts received subject light and outputs the subject light as an electric signal. The solid-state imaging device 14 is implemented by, for example, a complementary metal oxide semiconductor (CMOS) image sensor. The solid-state imaging device 14 has a pixel array unit in which a plurality of pixels is two-dimensionally arranged in a matrix, and supplies the signal processing unit 15 with pixel signals obtained as a result of receiving light in the respective pixels. Details of the solid-state imaging device 14 will be described later with reference to FIG. 2 and subsequent drawings.

The signal processing unit 15 performs various types of signal processing on a pixel signal supplied from the solid-state imaging device 14. For example, in a case where an instruction to record a still image is supplied from the control unit 13, the signal processing unit 15 generates, on the basis of the pixel signal from the solid-state imaging device 14, data of a still image (still image data) as an image for recording, and supplies the data to the recording unit 16. Furthermore, in a case where an instruction to generate a live view image, which is an image for display, is supplied from the control unit 13, the signal processing unit 15 generates, on the basis of the pixel signal from the solid-state imaging device 14, data of a live view image (live view image data), and supplies the data to the display unit 17. The signal processing unit 15 can perform predetermined image processing such as, for example, demosaic processing, shading correction, or color mixture correction, as necessary.

Furthermore, the signal processing unit 15 generates a signal for focus control on the basis of a pixel signal supplied from the solid-state imaging device 14, and supplies the generated signal to the AF control unit 18.

The recording unit 16 records (stores) the image data of the image for recording (still image) supplied from the signal processing unit 15. The recording unit 16 includes, for example, one or a plurality of removable recording media, such as a disk such as a digital versatile disc (DVD), or a semiconductor memory such as a memory card. These recording media may be incorporated in the imaging device 1 or may be detachable from the imaging device 1.

The display unit 17 displays an image on the basis of the image data of the image for display supplied from the signal processing unit 15. The display unit 17 displays, for example, a live view image, a still image read from the recording unit 16, or the like. The display unit 17 is implemented by, for example, a liquid crystal display (LCD), an organic electro-luminescence (EL) display, an electric viewfinder (EVF), or the like.

The AF control unit 18 calculates a focus shift amount (defocus amount) on the basis of the signal for focus control supplied from the signal processing unit 15, and judges whether or not an object to be focused (focus target object) is in focus. In a case where an object in a focus area is in focus, the AF control unit 18 supplies the drive unit 19 with information indicating the in-focus state as an in-focus judgment result. Furthermore, in a case where the focus target object is out of focus, the AF control unit 18 supplies the drive unit 19 with information indicating the calculated defocus amount as an in-focus judgment result.

The drive unit 19 drives the zoom lens 21, the diaphragm 22, and the focus lens 23. For example, the drive unit 19 calculates a drive amount of the focus lens 23 on the basis of the in-focus judgment result supplied from the AF control unit 18, and causes the focus lens 23 to move according to the calculated drive amount.

Specifically, in a case where focus is achieved, the drive unit 19 maintains a current position of the focus lens 23. Furthermore, in a case where focus is not achieved, the drive unit 19 calculates a drive amount (moving distance) on the basis of the in-focus judgment result indicating the defocus amount and the position of the focus lens 23, and causes the focus lens 23 to move according to the drive amount.

In the imaging device 1 configured as described above, the user checks an image displayed on the display unit 17, determines an image capturing timing, and presses the release button (shutter button) to capture an image. At this time, a live view image, which is an image for checking, is displayed on the display unit 17, and image data of the still image as the image for recording is recorded in the recording unit 16 at the timing of pressing the release button.

The solid-state imaging device 14 of the imaging device 1 can perform driving that achieves blackout free not only until the user checks the live view image displayed on the display unit 17 and confirms a release timing, but also after the user presses the release button. Here, the blackout refers to a phenomenon in which a live view image is not displayed on the display unit 17, and the blackout free refers to a state where no blackout occurs.

Hereinafter, details of the solid-state imaging device 14 will be described.

<2. Schematic Configuration Example of Solid-State Imaging Device>

Figure 2:
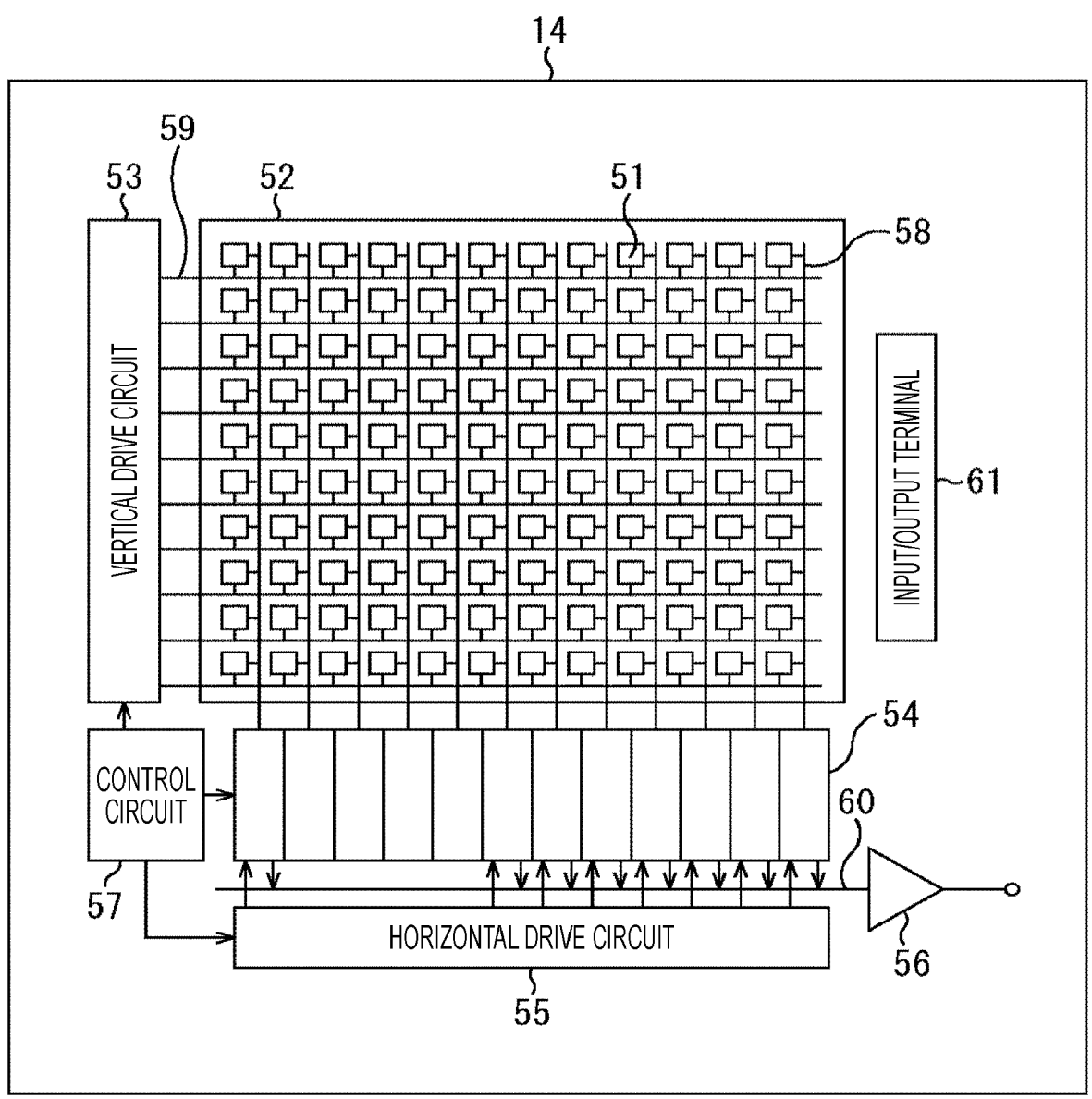
FIG. 2 is a block diagram illustrating a schematic configuration of the solid-state imaging device.

FIG. 2 is a block diagram illustrating a schematic configuration of the solid-state imaging device 14.

The solid-state imaging device 1 in FIG. 1 has a pixel array unit 52 in which pixels 51 are two-dimensionally arranged in a matrix on a semiconductor substrate using, for example, silicon (Si) as a semiconductor, and a peripheral circuit unit around the pixel array unit 52. The peripheral circuit unit includes a vertical drive circuit 53, column signal processing circuits 54, a horizontal drive circuit 55, an output circuit 56, a control circuit 57, or the like.

In the pixel array unit 52, for example, pixels 51 on which red, green, and blue color filters are arranged in a Bayer pattern are two-dimensionally arranged in a matrix. A pixel 51 has a photodiode as a photoelectric conversion unit and a plurality of pixel transistors. The plurality of pixel transistors includes, for example, four MOS transistors, which are a transfer transistor, a selection transistor, a reset transistor, and an amplification transistor.

Furthermore, the pixel 51 may have a shared pixel structure. This shared pixel structure includes a plurality of photodiodes, a plurality of transfer transistors, one shared floating diffusion (floating diffusion region), and another each one of shared pixel transistors. That is, in the shared pixel structure, photodiodes and transfer transistors that constitute a plurality of unit pixels are configured to share another each one of pixel transistors.

The vertical drive circuit 53 includes, for example, a shift register or an address decoder, selects a predetermined pixel drive wiring 59, supplies the selected pixel drive wiring 59 with a pulse for driving the pixels 51, and drives the pixels 51 row by row. That is, the vertical drive circuit 53 sequentially selects and scans each of the pixels 51 of the pixel array unit 52 in a vertical direction row by row, and supplies a column signal processing circuit 54 via a vertical signal line 58 with a pixel signal based on a signal charge generated according to an amount of received light in the photoelectric conversion unit of each of the pixels 51. Note that, although each of the pixel drive wiring 59 is illustrated with a single line in FIG. 2, the pixel drive wiring 59 actually includes a plurality of lines.

A column signal processing circuit 54 is arranged for each column of the pixels 51, and performs signal processing such as noise removal on signals output from the pixels 51 of one row with respect to each pixel column. For example, the column signal processing circuit 54 performs signal processing such as correlated double sampling (CDS) for removing pixel-specific fixed pattern noise, or AD conversion.

The horizontal drive circuit 55 includes, for example, a shift register, selects each of the column signal processing circuits 54 in order by sequentially outputting horizontal scanning pulses, and causes each of the column signal processing circuits 54 to output a pixel signal to a horizontal signal line 60.

The output circuit 56 performs predetermined signal processing on the signals sequentially supplied from each of the column signal processing circuits 54 through the horizontal signal line 60, and outputs the processed signals. For example, the output circuit 56 may perform only buffering or may perform various types of digital signal processing such as black level adjustment or column variation correction.

The control circuit 57 receives an input clock and data that orders an operation mode or the like, and outputs data such as internal information about the solid-state imaging device 14. That is, the control circuit 57 generates a clock signal or a control signal serving as a reference of operation of the vertical drive circuit 53, the column signal processing circuit 54, the horizontal drive circuit 55, or the like, on the basis of a vertical synchronization signal, a horizontal synchronization signal, and a master clock. Then, the control circuit 57 outputs the generated clock signal and control signal to the vertical drive circuit 53, the column signal processing circuits 54, the horizontal drive circuit 55, or the like. An input/output terminal 61 includes, for example, a solder ball or the like, and exchanges signals with an outside.

The solid-state imaging device 14 configured as described above is a CMOS image sensor called a column AD method in which the column signal processing circuits 54 that perform CDS processing and AD conversion processing are arranged with respect to each pixel column.

<3. Circuit Configuration Example of Pixel>

Figure 3:
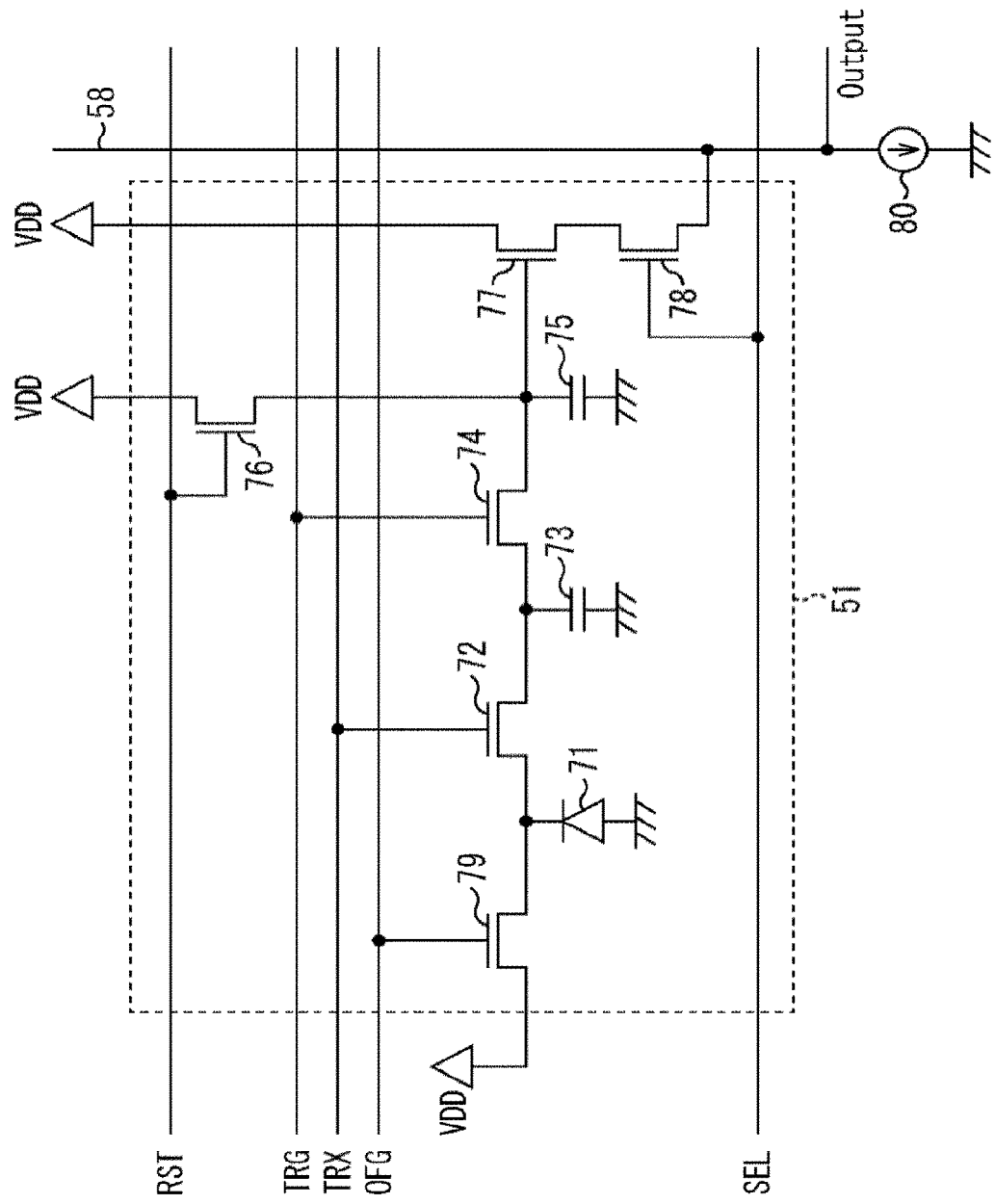
FIG. 3 is a diagram illustrating a circuit configuration example of a pixel.

FIG. 3 illustrates an equivalent circuit of a pixel 51.

The pixel 51 has a photodiode 71, a first transfer transistor 72, a memory unit (MEM) 73, a second transfer transistor 74, a floating diffusion (FD) 75, a reset transistor 76, an amplification transistor 77, a selection transistor 78, and a discharge transistor 79.

The photodiode 71 is a photoelectric conversion unit that receives and photoelectrically converts incident light to generate and accumulate an electric charge (signal charge). An anode terminal of the photodiode 71 is grounded, and a cathode terminal of the photodiode 71 is connected to the memory unit 73 via the first transfer transistor 72. Furthermore, the cathode terminal of the photodiode 71 is also connected to the discharge transistor 79.

When turned on by a transfer signal TRX, the first transfer transistor 72 reads an electric charge generated by the photodiode 71 and transfers the electric charge to the memory unit 73. The memory unit 73 is a charge holding unit that temporarily holds an electric charge until a read-out timing comes and the electric charge is transferred to the FD 75. When turned on by a transfer signal TRG, the second transfer transistor 74 transfers the electric charge held in the memory unit 73 to the FD 75.

The FD 75 is a charge holding unit that holds the electric charge read from the memory unit 73 in order to read the electric charge as a signal. When the reset transistor 76 is turned on by a reset signal RST, the electric charge held in the FD 75 is discharged to a constant voltage source VDD to reset an electric potential of the FD 75.

The amplification transistor 77 outputs a pixel signal corresponding to an electric potential of the FD 75. That is, along with a load MOS 80 as a constant current source, the amplification transistor 77 constitutes a source follower circuit, and a pixel signal indicating a level corresponding to the electric charge held in the FD 75 is output from the amplification transistor 77 to a column signal processing circuit 54 (FIG. 2) via the selection transistor 78. The load MOS 80 is provided in the column signal processing circuit 54, for example.

The selection transistor 78 is turned on when the pixel 51 is selected by a selection signal SEL, and outputs a pixel signal of the pixel 51 to the column signal processing circuit 54 via the vertical signal line 58. When turned on by a discharge signal OFG, the discharge transistor 79 discharges unnecessary electric charge accumulated in the photodiode 71 to the constant voltage source VDD. The transfer signals TRX and TRG, the reset signal RST, the selection signal SEL, and the discharge signal OFG are controlled by the vertical drive circuit 53 and supplied via the pixel drive wiring 59 (FIG. 2).

The pixel 51 has a pixel circuit as described above, and the solid-state imaging device 14 can capture an image with the global shutter method.

Figure 4:
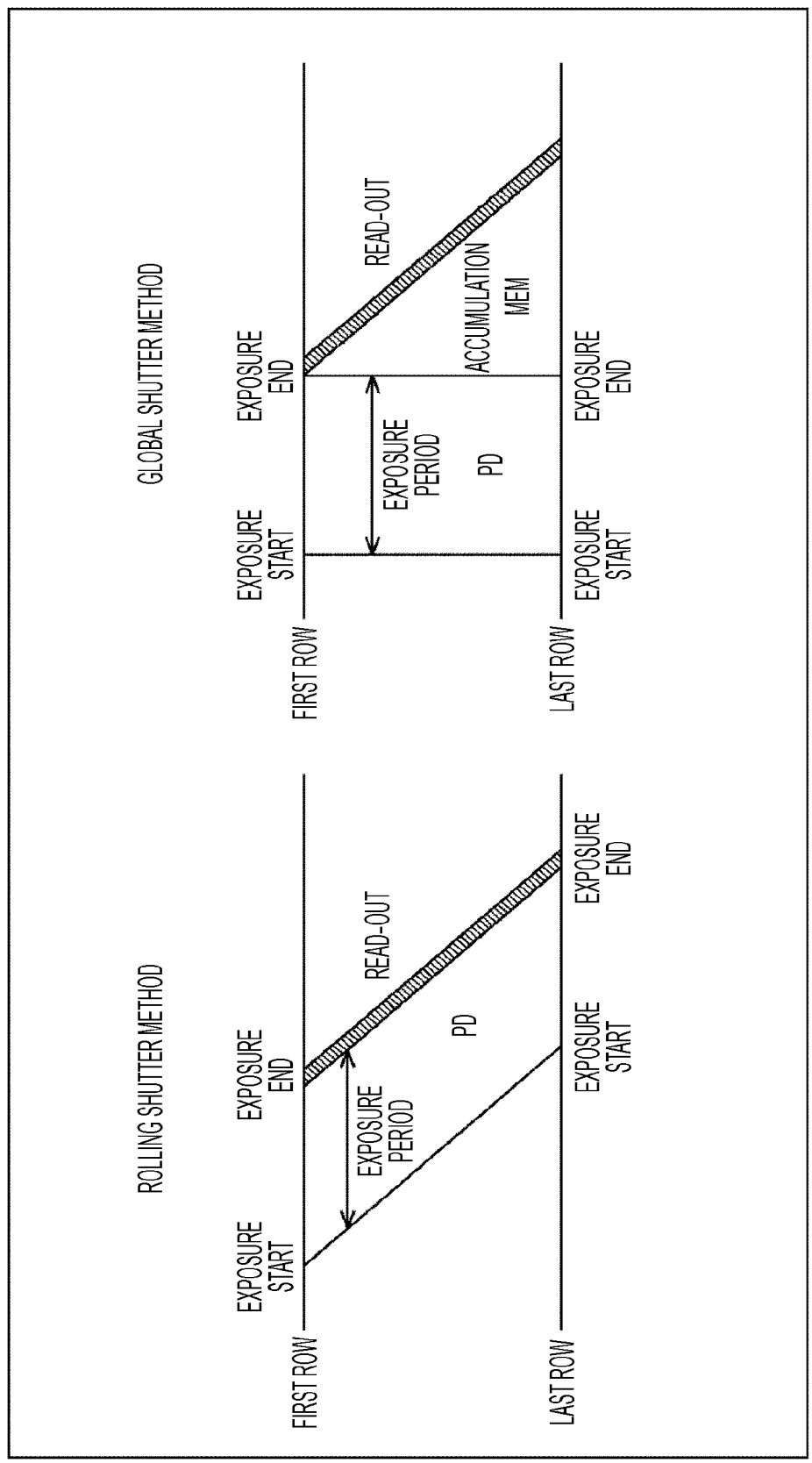
FIG. 4 is a conceptual diagram illustrating imaging methods, which are a global shutter method and a rolling shutter method.

FIG. 4 is a conceptual diagram illustrating imaging methods, which are the global shutter method and a rolling shutter method.

As illustrated on a left side in FIG. 4, the rolling shutter method is a method for executing exposure start, exposure end, and read-out of accumulated electric charge row by row in order from an upper part (first row) of the pixel array unit 52. Even if exposure periods are the same across the respective rows, exposure periods of all the pixels for accumulating electric charge cannot coincide with one another because exposure and read-out operation are executed row by row in order, and therefore, in a case where the subject is moving, or the like, distortion occurs when capturing an image.

Meanwhile, as illustrated on a right side in FIG. 4, the global shutter method is a method for performing operation covering from exposure start to exposure end on all the pixels of the pixel array unit 52 simultaneously, and performing reading in order from the upper part of the pixel array unit 52 after the exposure end. With the global shutter method, the exposure periods of all the pixels coincide with one another, and therefore, distortion does not occur even in a case such as where the subject is moving.

Operation of a pixel 51 by the global shutter method will be briefly described with reference to FIG. 5.

First, before exposure is started, the discharge transistor 79 is turned on by a discharge signal OFG at High level being supplied to the discharge transistor 79, and electric charge accumulated in the photodiode 71 is discharged to the constant voltage source VDD, by which the photodiode 71 is reset.

After the photodiode 71 is reset, when the discharge transistor 79 is turned off by a discharge signal OFG at a Low level, exposure is started in all the pixels.

Figure 5:
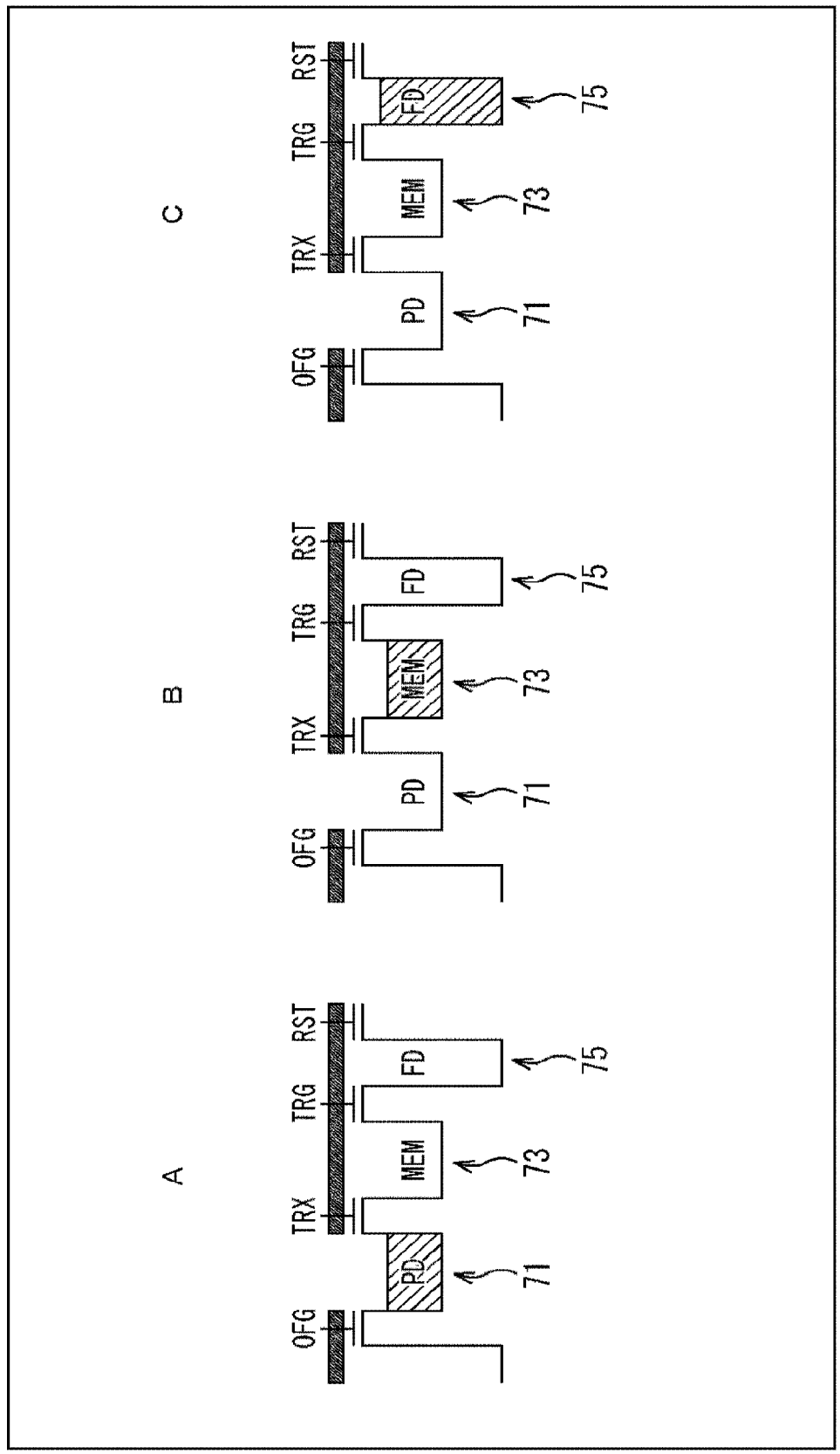
FIG. 5 is a diagram for briefly describing operation of a pixel by the global shutter method.

When a predetermined exposure time has elapsed, as illustrated in A of FIG. 5, electric charge corresponding to an amount of received light is generated and accumulated in the photodiode 71. Then, as illustrated in B of FIG. 5, in all the pixels of the pixel array unit 52, the first transfer transistor 72 is turned on by the transfer signal TRX, and the electric charge accumulated in the photodiode 71 is transferred to the memory unit 73.

After the first transfer transistor 72 is turned off, the electric charge held in the memory unit 73 of each of the pixels 51 is sequentially read to a column signal processing circuits 54 row by row. In read-out operation, as illustrated in C of FIG. 5, the second transfer transistor 74 of the pixel 51 on a read row is turned on by a transfer signal TRG, and electric charge held in the memory unit 73 is transferred to the FD 75. Then, when the selection transistor 78 is turned on by a selection signal SEL, a signal indicating a level corresponding to the electric charge held in the FD 75 is output from the amplification transistor 77 to the column signal processing circuit 54 via the selection transistor 78.

<4. Comparative Examples of Achieving Blackout Free>

Before describing driving of the solid-state imaging device 14 that achieves blackout free, other drivings that achieve blackout free will be briefly described as comparative examples.

Note that the drivings described with reference to FIGS. 6 and 7 can also be executed by the solid-state imaging device 14 under a certain condition such as a set frame rate, and therefore will be described as being executed by the solid-state imaging device 14.

Hereinafter, it is assumed that a vertical synchronization signal corresponding to a frame rate of 120 fps is supplied to the pixel array unit 52, and exposure and read-out of all the pixels of the pixel array unit 52 are performed on the basis of the vertical synchronization signal.

Figure 6:
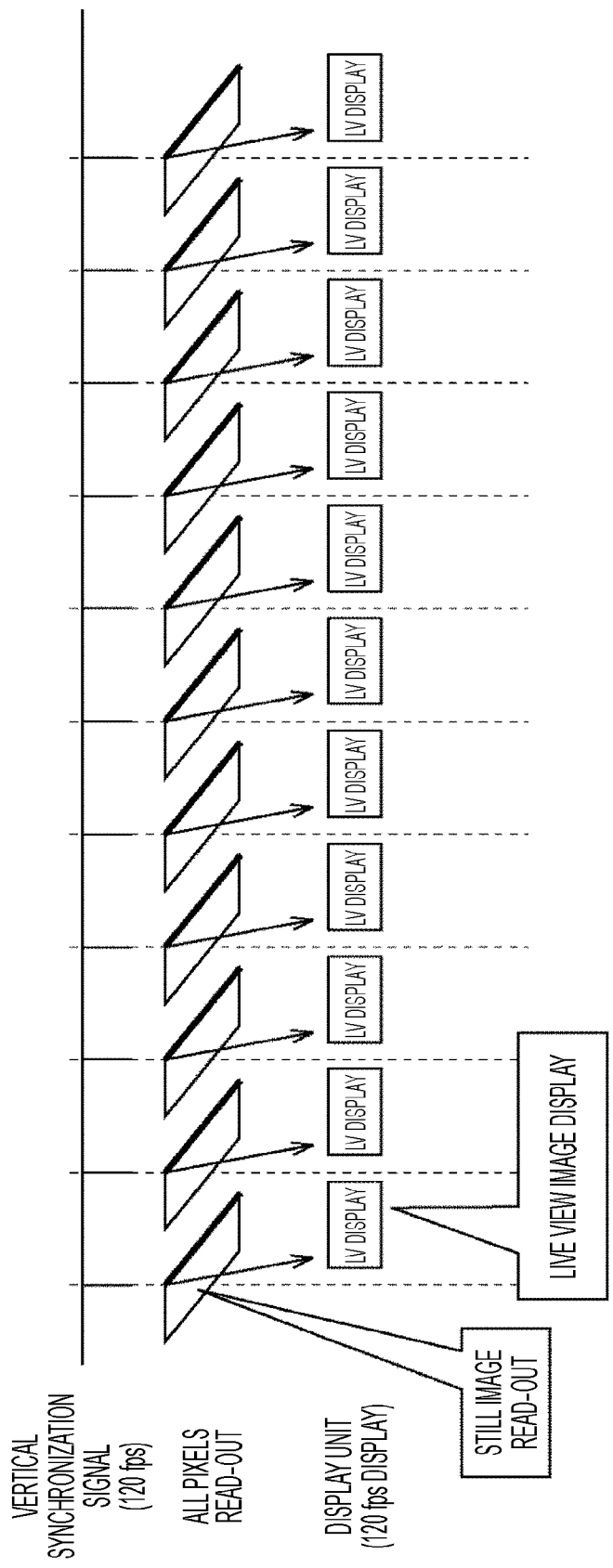
FIG. 6 is a conceptual diagram illustrating a first driving method for achieving blackout free.

FIG. 6 is a conceptual diagram illustrating a first driving method as a comparative example that achieves blackout free.

The first driving method is a method for simply generating a still image as an image for recording by exposure and read-out of all the pixels of the pixel array unit 52 at a frame rate of 120 fps, and causing the display unit 17 to display (LV display) the still image as a live view image at the same speed. Although there is no problem with this driving method in a case where the frame rate is relatively low, such as 30 fps, the circuit increases in scale and power consumption also increases as the frame rate increases, such as 60 fps or 120 fps. Furthermore, in a case where the frame rate is too low, such as 10 fps, the live view image seems to be discontinuous images in frame-by-frame advance.

Figure 7:
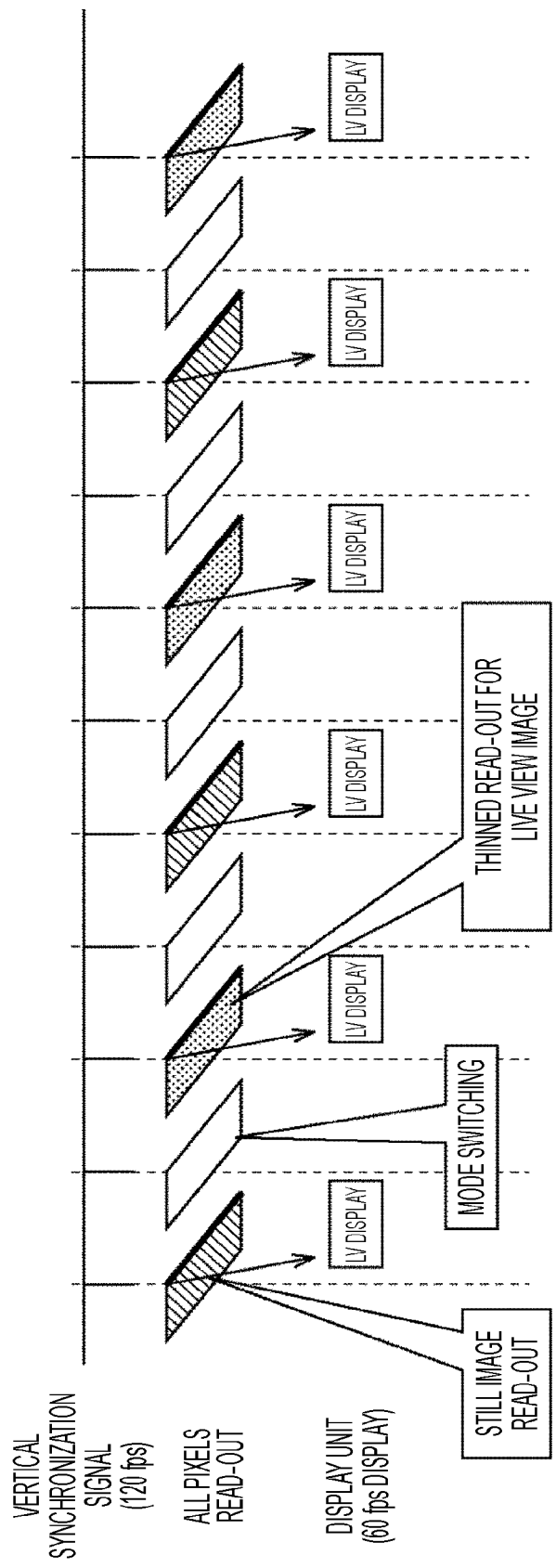
FIG. 7 is a conceptual diagram illustrating a second driving method for achieving blackout free.

FIG. 7 is a conceptual diagram illustrating a second driving method as a comparative example that achieves blackout free.

The second driving method is a method for generating a live view image by thinned read-out and displaying the live view image on the display unit 17 separately from a still image as an image for recording to be recorded in the recording unit 16. Although both a still image obtained by exposure and read-out of all the pixels and an image for a live view image obtained by thinned read-out can be displayed on the display unit 17 by this driving method, it is necessary to switch between driving for an image for recording and driving for the live view image, and an image cannot be generated at a time of mode switching. Therefore, as illustrated in FIG. 7, an image is not generated one in every two vertical synchronization timings, and therefore, a frame rate for the live view image displayed on the display unit 17 is 60 fps, which corresponds to half of the frame rate of the vertical synchronization signal. If an image is to be displayed on the display unit 17 at a frame rate (120 fps) similar to the frame rate in the first driving method, pixel read-out at twice speed is required, and also power consumption increases due to high-speed driving.

Accordingly, because it is necessary to read an image with high-speed driving in both the first driving method and the second driving method in FIGS. 6 and 7 respectively, a circuit for high-speed read-out is required, and power consumption increases.

<5. Drive of Solid-State Imaging Device>

Next, a driving method by the solid-state imaging device 14 that achieves blackout free will be described with reference to FIGS. 8 to 12. The driving method described below will be referred to as a third driving method.

In the third driving method, the solid-state imaging device 14 exposes all the pixels of the pixel array unit 52 at the same exposure timing and performs thinned read-out 2(N−1) times in which all the pixels are thinned to 1/N (N is a natural number), by which the solid-state imaging device 14 reads electric charge in all the pixels of the pixel array unit 52, the electric charge being generated at the same exposure timing, and records the electric charge in the recording unit 16 as a still image.

Figure 8:
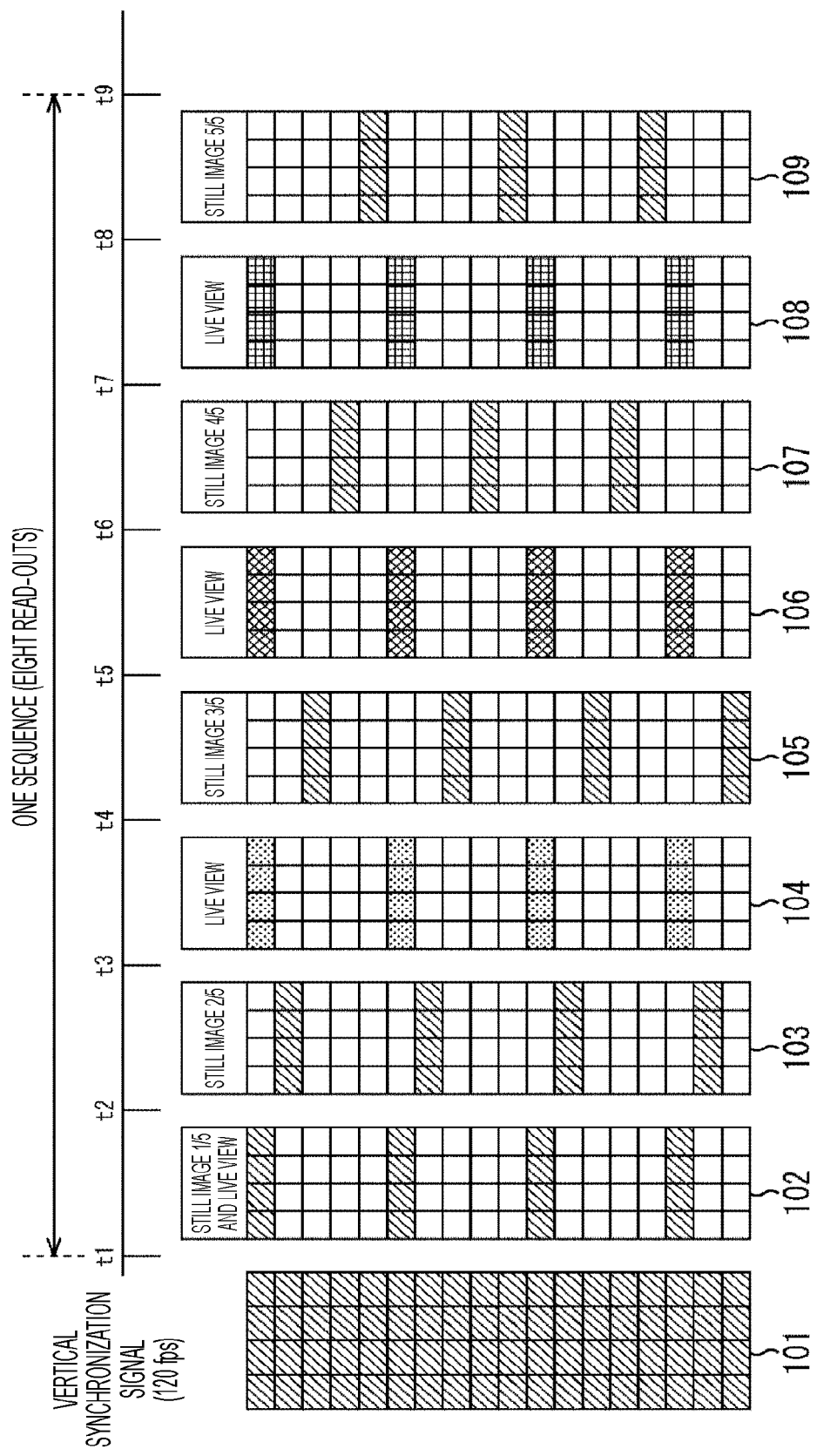
FIG. 8 is a conceptual diagram illustrating a third driving method for achieving blackout free.

FIG. 8 illustrates an example of a case where N=5, that is ⅕ thinned read-out, which thins out electric charge in all the pixels exposed at the same exposure timing to ⅕, is performed eight times, by which a still image is output and recorded in the recording unit 16. In the ⅕ thinned read-out, ⅕ thinned read-out is performed eight times as one sequence, by which one still image exposed at the same exposure timing is output to the imaging device 1.

In FIG. 8, time t1, t2, t3, . . . indicate read-out timings of the pixel array unit 52 according to a vertical synchronization signal of the frame rate of 120 fps.

First, the solid-state imaging device 14 performs exposure on all pixel rows of the pixel array unit 52 for the same exposure period in one vertical scanning period from time t1 to t2. Pixel data 101 illustrated on a leftmost side in FIG. 8 indicates that electric charge is accumulated in each of the pixels 51 of the pixel array unit 52 after an exposure period ends in time t1 to t2.

After the exposure period ends, the solid-state imaging device 14 performs ⅕ thinned read-out in which all the pixel rows of the pixel array unit 52 are read at intervals of five rows (every five rows). By the ⅕ thinned read-out in the period from the time t1 to t2, (1+5p)-th pixel rows (p=0, 1, 2, 3, 4 . . . , and so on) of the pixel array unit 52 are sequentially read row by row from a first pixel row. Pixel data 102 indicates pixel rows read by the ⅕ thinned read-out during the time t1 to t2.

In the imaging device 1, pixel signals on the respective pixel rows read by the ⅕ thinned read-out during the time t1 to t2 are utilized as parts of a still image as an image for recording, and as a live view image as an image for display.

In next one vertical scanning period from the time t2 to t3, the solid-state imaging device 14 performs next ⅕ thinned read-out. By the ⅕ thinned read-out during this period, (2+5p)-th pixel rows of the pixel array unit 52 are sequentially read row by row from a second pixel row. Pixel data 103 indicates pixel rows read by the ⅕ thinned read-out during the time t2 to t3.

In the imaging device 1, pixel signals on the respective pixel rows read by the ⅕ thinned read-out during the time t2 to t3 are utilized as parts of a still image as an image for recording.

In next one vertical scanning period from the time t3 to t4, the solid-state imaging device 14 performs exposure and read-out of (1+5p)-th pixel rows, which are the same as the rows read at the time t1. That is, the solid-state imaging device 14 performs exposure and read-out by using only pixel rows, among all the pixel rows of the pixel array unit 52, from which pixel signals for the still image have already been read. Pixel data 104 indicates pixel rows read by the ⅕ thinned read-out during the time t3 to t4. In the pixel data 104, each of the pixels are represented by a pattern (dots) different from hatching. This indicates that read pixel signals are pixel signals different from the pixel signals for the still image generated at the time t1.

In the imaging device 1, pixel signals on the respective pixel rows read by the ⅕ thinned read-out during the time t3 to t4 are utilized as parts of the live view image as the image for display.

In next one vertical scanning period from the time t4 to t5, the solid-state imaging device 14 performs next ⅕ thinned read-out. By the ⅕ thinned read-out during this period, (3+5p)-th pixel rows of the pixel array unit 52 are sequentially read row by row from a third pixel row. Pixel data 105 indicates pixel rows read by the ⅕ thinned read-out during the time t4 to t5.

In the imaging device 1, pixel signals on the respective pixel rows read by the ⅕ thinned read-out during the time t4 to t5 are utilized as parts of a still image as an image for recording.

In next one vertical scanning period from the time t5 to t6, the solid-state imaging device 14 performs exposure and read-out of (1+5p)-th pixel rows, which are the same as the rows read at the time t1. That is, the solid-state imaging device 14 performs exposure and read-out by using only pixel rows, among all the pixel rows of the pixel array unit 52, from which pixel signals for the still image have already been read. Pixel data 106 indicates pixel rows read by the ⅕ thinned read-out during the time t5 to t6. In the pixel data 106, each of the pixels are represented by a pattern (diagonal lattice) different from hatching. This indicates that read pixel signals are pixel signals different from the pixel signals for the still image generated at the time t1.

In the imaging device 1, pixel signals on the respective pixel rows read by the ⅕ thinned read-out during the time t5 to t6 are utilized as parts of the live view image as the image for display.

In next one vertical scanning period from the time t6 to t7, the solid-state imaging device 14 performs next ⅕ thinned read-out. By the ⅕ thinned read-out during this period, (4+5p)-th pixel rows of the pixel array unit 52 are sequentially read row by row from a fourth pixel row. Pixel data 107 indicates pixel rows read by the ⅕ thinned read-out during the time t6 to t7.

In the imaging device 1, pixel signals on the respective pixel rows read by the ⅕ thinned read-out during the time t6 to t7 are utilized as parts of a still image as an image for recording.

In next one vertical scanning period from the time t7 to t8, the solid-state imaging device 14 performs exposure and read-out of (1+5p)-th pixel rows, which are the same as the rows read at the time t1. That is, the solid-state imaging device 14 performs exposure and read-out by using only pixel rows, among all the pixel rows of the pixel array unit 52, from which pixel signals for the still image have already been read. Pixel data 108 indicates pixel rows read by the ⅕ thinned read-out during the time t7 to t8. In the pixel data 108, each of the pixels are represented by a pattern (lattice) different from hatching. This indicates that read pixel signals are pixel signals different from the pixel signals for the still image generated at the time t1.

In the imaging device 1, pixel signals on the respective pixel rows read by the ⅕ thinned read-out during the time t7 to t8 are utilized as parts of the live view image as the image for display.

In next one vertical scanning period from the time t8 to t9, the solid-state imaging device 14 performs next ⅕ thinned read-out. By the ⅕ thinned read-out during this period, (5+5p)-th pixel rows of the pixel array unit 52 are sequentially read row by row from a fifth pixel row. Pixel data 107 indicates pixel rows read by the ⅕ thinned read-out during the time t8 to t9.

In the imaging device 1, pixel signals on the respective pixel rows read by the ⅕ thinned read-out during the time t8 to t9 are utilized as parts of a still image as an image for recording.

As described above, in the ⅕ thinned read-out, ⅕ thinned read-out is performed eight times as one sequence, by which one still image exposed at the same exposure timing is output to the imaging device 1.

In one sequence, the solid-state imaging device 14 repeats exposure at a frame rate of 60 fps, which is half of 120 fps, for ⅕ of the pixel rows of the pixel array unit 52. Then, the solid-state imaging device 14 performs reading of electric charge in pixel rows exposed at the same exposure timing in a first one vertical scanning period (time t1 to t2) of one sequence, and read-out of electric charge in a pixel row exposed at a frame rate of 60 fps alternately in the one vertical scanning period. The pixel rows on which exposure is repeated at the frame rate of 60 fps are pixel rows read at an odd-numbered time among the eight times of ⅕ thinned read-out from time t1 to t9, and are the same pixel rows.

In each of the pixels 51 in the (1+5p)-th pixel rows on which exposure is repeatedly performed at a frame rate of 60 fps, resetting of the photodiode 71 and the FD 75, generation of electric charge corresponding to an amount of received light, transfer to and holding in the memory unit 73, and transfer to and read-out from the FD 75 are executed in one vertical scanning period.

In each of the pixels 51 in the pixel rows read at an even-numbered time in one sequence, after electric charge corresponding to the amount of received light is transferred to the memory unit 73 in one vertical scanning period from time t1 to t2, the electric charge is held as is in the memory unit 73 until one vertical scanning period of a read-out timing. Then, when the one vertical scanning period of the read-out timing has come, the electric charge held in the memory unit 73 is transferred to the FD 75 and read.

Figure 9:
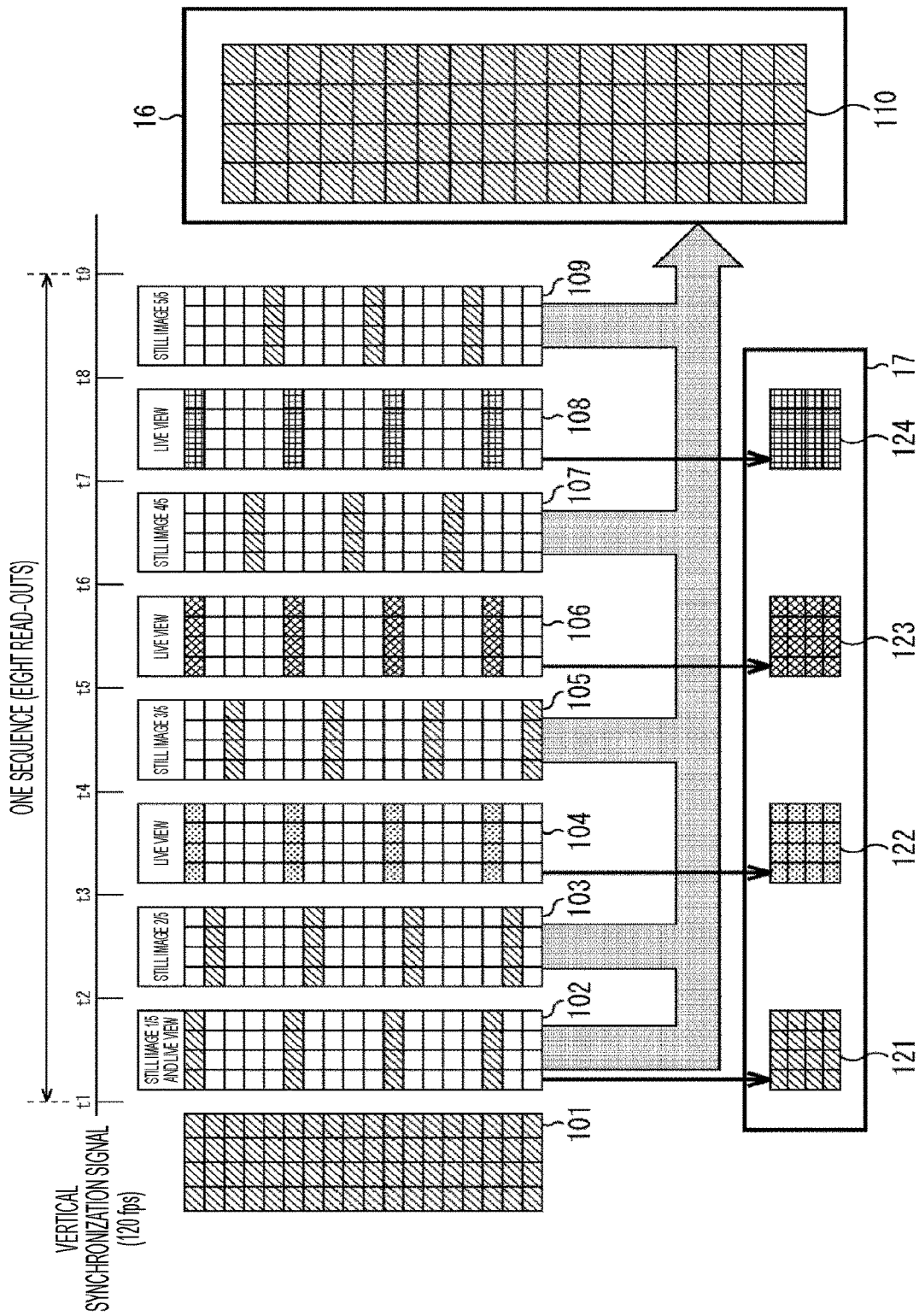
FIG. 9 is a conceptual diagram illustrating the third driving method for achieving blackout free.

As illustrated in FIG. 9, the recording unit 16 of the imaging device 1 records a still image 110 generated by being output in five parts at a frame rate of 60 fps, which is half of 120 fps, by signal output from the solid-state imaging device 14 during the above-described eight vertical scanning periods of time t1 to t9 (one sequence).

Furthermore, the display unit 17 of the imaging device 1 sequentially displays live view images 121 to 124 having resolution of ⅕ of full resolution of the pixel array unit 52 and being updated at a frame rate of 60 fps, which is half of 120 fps.

Figure 10:
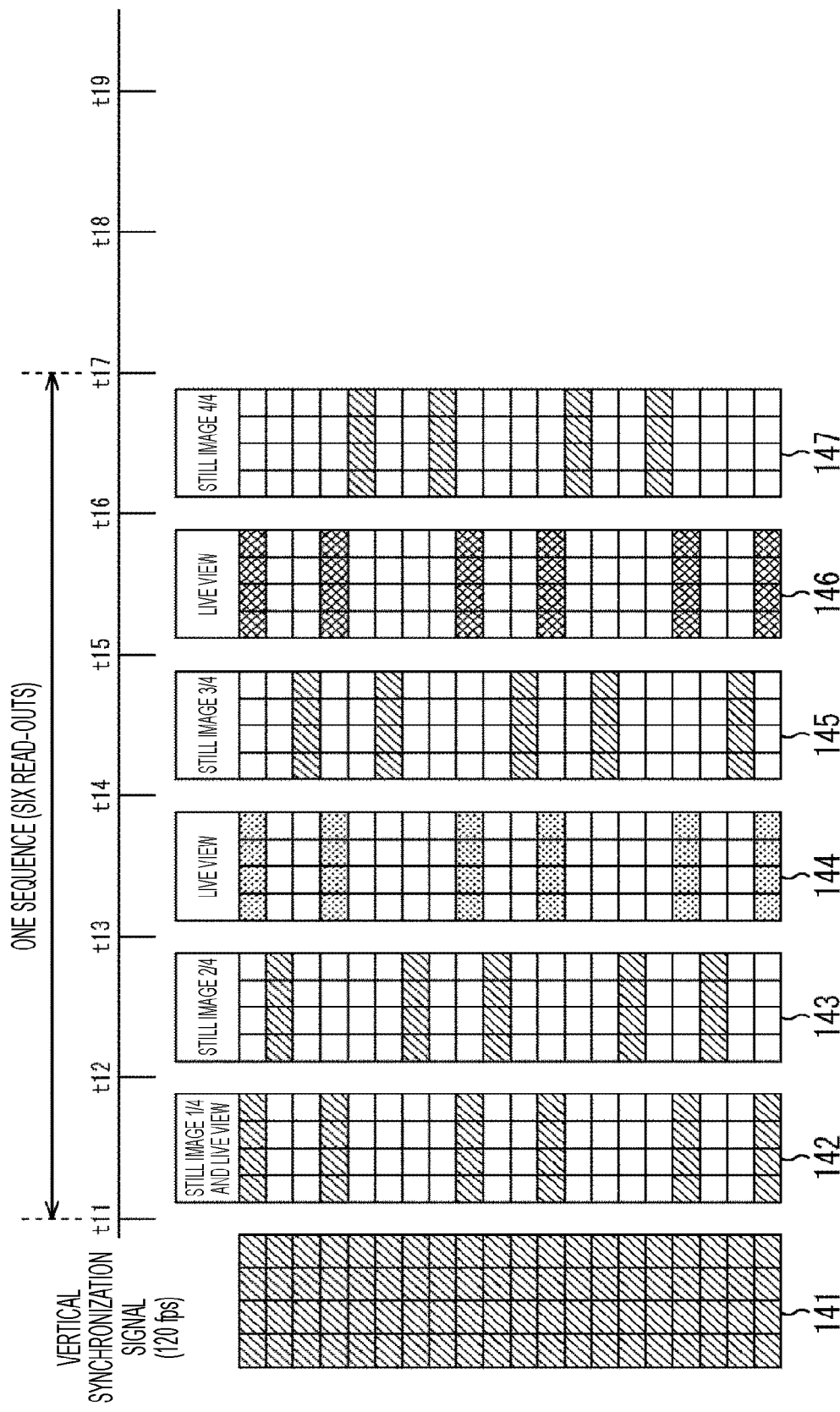
FIG. 10 is a conceptual diagram illustrating the third driving method for achieving blackout free.

FIG. 10 illustrates an example of a case where N=4, that is ¼ thinned read-out, which thins out electric charge in all the pixels exposed at the same exposure timing to ¼, is performed six times, by which a still image is output.

In the ¼ thinned read-out, one sequence includes six times of ¼ thinned read-out, and one still image exposed at the same exposure timing is output to the imaging device 1 by performing ¼ thinned read-out six times.

Pixel data 141 obtained by exposure in one vertical scanning period from time t11 to t12 is divided into pixel data 142 obtained by ¼ thinned read-out during a first time period from the time t11 to t12, pixel data 143 obtained by ¼ thinned read-out during a second time period from the time t12 to t13, pixel data 145 obtained by ¼ thinned read-out during a fourth time period from time t14 to t15, and pixel data 147 obtained by ¼ thinned read-out during a sixth time period from time t16 to t17, output to the imaging device 1 in order, and recorded as one still image in the recording unit 16 of the imaging device 1.

Meanwhile, the pixel data 142 obtained by the ¼ thinned read-out during the first time period from the time t11 to t12, pixel data 144 obtained by ¼ thinned read-out during a third time period from the time t13 to t14, and pixel data 146 obtained by ¼ thinned read-out during a fifth time period from the time t15 to t16 are sequentially output to the imaging device 1, and displayed as a live view image on the display unit 17 of the imaging device 1.

Here, the pixel rows are read at intervals of five rows during one vertical scanning period in the ⅕ thinned read-out illustrated in FIG. 8, whereas intervals of two rows and intervals of four rows are alternately arranged in the ¼ thinned read-out in FIG. 10. In other words, in the ⅕ thinned read-out illustrated in FIG. 8, the ⅕ thinned read-out is repeatedly executed in the vertical direction, whereas, in the ¼ thinned read-out in FIG. 10, ⅓ thinned read-out and ⅕ thinned read-out are alternately repeatedly executed in the vertical direction, achieving ¼ thinned read-out. This is because of the following reasons.

In an image sensor with the Bayer pattern, if read-out is performed at intervals of N rows in a case where N in 1/N thinning is an even number as in the ¼ thinned read-out or ⅙ thinned read-out, only either RG pixel rows, which are pixel rows of red pixels and green pixels, or GB pixel rows, which are pixel rows of green pixels and blue pixels, are read, and unevenness occurs in color information for a live view image. Therefore, in 1/N thinned read-out in a case where N is an even number, the solid-state imaging device 14 performs the 1/N thinned read-out on the pixel array unit 52 as a whole by alternately performing 1/(N−1) thinned read-out and 1/(N+1) thinned read-out. With this arrangement, the RG pixel rows and the GB pixel rows can be alternately read, and unevenness of color information in the live view image can be prevented from occurring.

Figure 11:
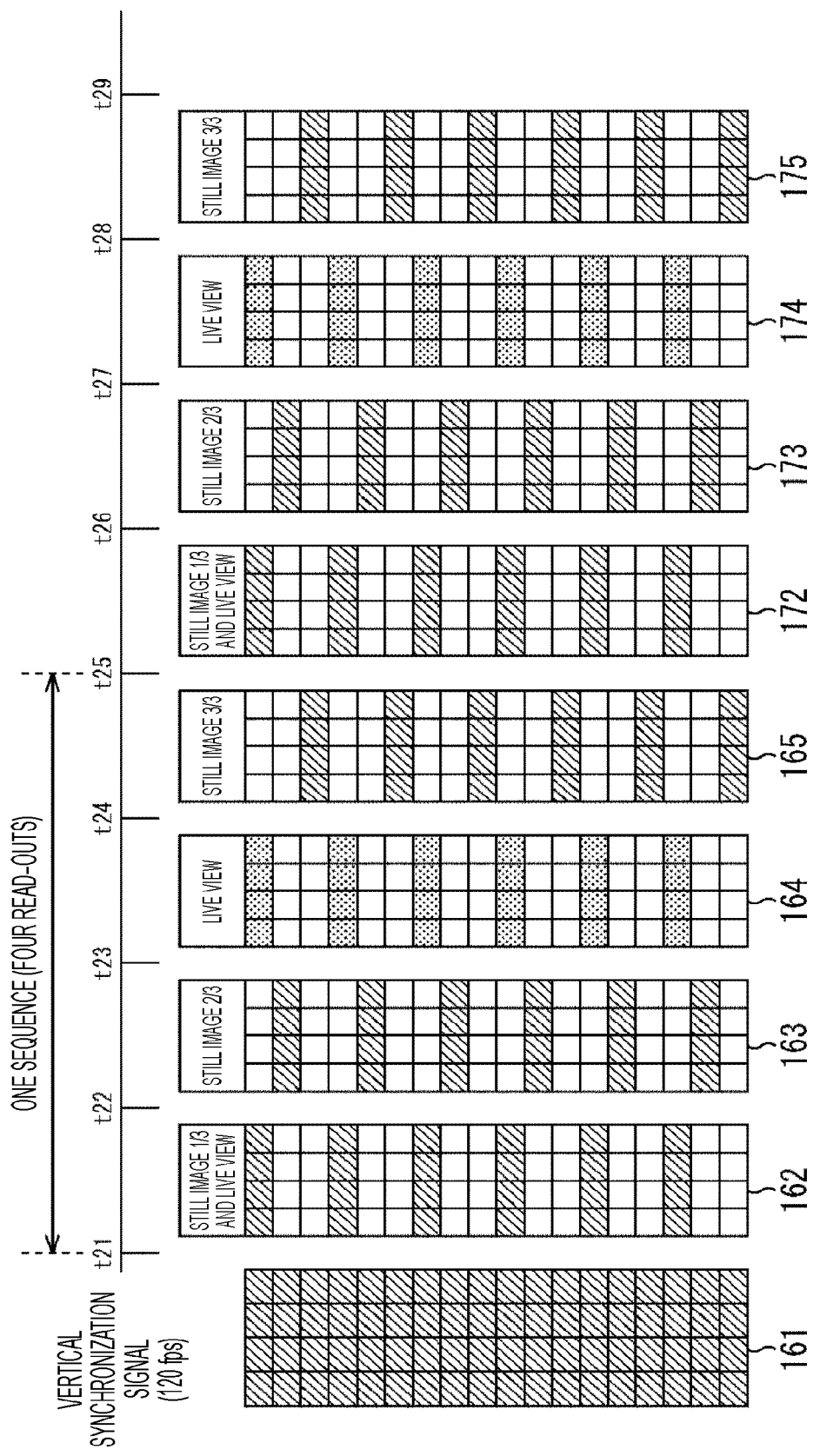
FIG. 11 is a conceptual diagram illustrating the third driving method for achieving blackout free.

FIG. 11 illustrates an example of a case where N=3, that is ⅓ thinned read-out, which thins out electric charge in all the pixels exposed at the same exposure timing to ⅓, is performed four times, by which a still image is output.

In the ⅓ thinned read-out, one sequence includes four times of ⅓ thinned read-out, and one still image exposed at the same exposure timing is output to the imaging device 1 by performing ⅓ thinned read-out four times.

Pixel data 161 obtained by exposure in one vertical scanning period from time t21 to t22 is divided into pixel data 162 obtained by ⅓ thinned read-out during a first time period from the time t21 to t22, pixel data 163 obtained by ⅓ thinned read-out during a second time period from the time t22 to t23, and pixel data 165 obtained by ⅓ thinned read-out during a fourth time period from time t24 to t25, output to the imaging device 1 in order, and recorded as one still image in the recording unit 16 of the imaging device 1.

Meanwhile, the pixel data 162 obtained by the ⅓ thinned read-out during the first time period from the time t21 to t22 and pixel data 164 obtained by ⅓ thinned read-out during a third time period from the time t33 to t34 are sequentially output to the imaging device 1, and displayed as a live view image on the display unit 17 of the imaging device 1.

Because the ⅓ thinned read-out in FIG. 11 is 1/N thinned read-out in a case where N is an odd number, pixel rows are read at intervals of three rows during one vertical scanning period similar to the ⅕ thinned read-out illustrated in FIG. 8.

As described above, in the 1/N thinned read-out, one sequence includes 1/N thinned read-out of 2(N−1) times, and one still image exposed at the same exposure timing is output to the imaging device 1 by performing 1/N thinned read-out 2(N−1) times. In 1/N thinned read-out in a case where N is an odd number, the solid-state imaging device 14 repeats read-out at intervals of N rows in the vertical direction, and in 1/N thinned read-out in a case where N is an even number, the solid-state imaging device 14 alternately performs reading at intervals of (N−1) rows and reading at intervals of (N+1) rows in the vertical direction.

Furthermore, every other one vertical scanning period, the solid-state imaging device 14 alternately performs reading of electric charge in a pixel row exposed at the same exposure timing and reading of electric charge in a pixel row repeatedly exposed at a frame rate of 60 fps, which is half of 120 fps, for 1/N pixel rows of the pixel array unit 52. The pixel rows on which exposure is repeated at the frame rate of 60 fps, which is half of 120 fps, are pixel rows read at an odd-numbered time among the 1/N thinned read-out of 2(N−1) times, and are the same pixel rows.

FIG. 12 is a table comparing read-out speeds of the first to third driving methods.

As illustrated in FIG. 12, cases where a frame rate for a live view image displayed on the display unit 17 of the imaging device 1 (displayed frame rate) is set to, for example, 30 fps, 60 fps, and 120 fps are compared.

According to the first driving method, the solid-state imaging device 14 needs to read and output an image at the same speed as a displayed frame rate. That is, in the first driving method, read-out speeds corresponding to the displayed frame rates of 30 fps, 60 fps, and 120 fps are 30 fps, 60 fps, and 120 fps, respectively.

According to the second driving method, the solid-state imaging device 14 needs to read and output an image at twice speed of a displayed frame rate. That is, in the second driving method, read-out speeds corresponding to the displayed frame rates of 30 fps, 60 fps, and 120 fps are 60 fps, 120 fps, and 240 fps, respectively.

Meanwhile, according to the third driving method, as described with reference to FIG. 8, in a case of ⅕ thinned read-out, display is performed at a frame rate of 60 fps, which is half of 120 fps, and the read-out speed corresponds to 120/5=24 fps at this time, because ⅕ thinned read-out is performed. That is, read-out speed corresponding to the displayed frame rate of 60 fps is 24 fps. Accordingly, in the third driving method, read-out frame rates corresponding to the displayed frame rates of 30 fps, 60 fps, and 120 fps are 12 fps, 24 fps, and 48 fps, respectively.

As described above, according to the third driving method, it is not necessary to perform reading at an excessively high speed, and blackout free can be achieved by low-speed read-out. Because high-speed read-out is not required, power consumption can be reduced, and a circuit for high-speed read-out can be eliminated, by which the solid-state imaging device 14 can be manufactured at a low cost.

Processing by the imaging device 1 corresponding to output of a still image and live view image from the solid-state imaging device 14 according to the third driving method will be described.

According to the imaging mode or the like set in the operation unit 12 by the user, the control unit 13 of the imaging device 1 designates an operation mode in accordance with the third driving method to the solid-state imaging device 14 and the signal processing unit 15. The operation mode in accordance with the third driving method may be designated by the control unit 13 to the signal processing unit 15, and the signal processing unit 15 may designate the third driving method to the solid-state imaging device 14.

When the operation mode in accordance with the third driving method is designated, as described above, the solid-state imaging device 14 performs all-pixel exposure at the same exposure timing in the first one vertical scanning period of one sequence. Then, the solid-state imaging device 14 performs 1/N thinned read-out for a live view image as an image for display in one vertical scanning period at an odd-numbered time in one sequence, and performs 1/N thinned read-out for a still image as an image for recording in one vertical scanning period at an even-numbered time in the one sequence. However, first data for the live view image in the one sequence also serves as data for the still image.

When the operation mode in accordance with the third driving method is designated, the signal processing unit 15 identifies that data for the still image and live view image is supplied from the solid-state imaging device 14 in the above-described order, and performs processing corresponding to the supplied image data. Specifically, in a case where data for the live view image is supplied from the solid-state imaging device 14, the signal processing unit 15 supplies the data to the display unit 17 and causes the display unit 17 to display the data. Furthermore, in a case where data for the still image is supplied from the solid-state imaging device 14, the signal processing unit 15 supplies the data to the recording unit 16 and causes the recording medium to record the data. Data for both the live view image and the still image is supplied to both the display unit 17 and the recording unit 16.

By using the solid-state imaging device 14 to which the above-described embodiment is applied, blackout free can be achieved in the imaging device 1.

<Others>

Depending on the imaging mode or the like designated with the operation unit 12 by the user, the control unit 13 of the imaging device 1 can also designate an operation mode in accordance with the above-described first driving method or second driving method to the solid-state imaging device 14 and the signal processing unit 15 to cause the solid-state imaging device 14 and the signal processing unit 15 to operate.

Although the above-described pixel circuit of a pixel 51 includes the memory unit 73 that holds electric charge generated by the photodiode 71 until a read-out timing comes, the above-described third driving method may be executed by using a circuit configuration not including the memory unit 73 as the pixel circuit of the pixel 51. In this case, electric charge generated by the photodiode 71 is held in the FD 75 until the read-out timing comes.

Although an embodiment of an imaging device including a solid-state imaging device to which the present technology is applied has been described above, the present technology can be applied to an electronic apparatus other than an imaging device including a solid-state imaging device, which is for example, a mobile terminal device having an imaging function such as a smartphone, a personal computer, a game machine, a wearable terminal, or the like.

Embodiments of the present technology are not limited to the above-described embodiments, and various changes can be made without departing from the scope of the present technology.

For example, parts of the embodiment described above may be used in combination as appropriate.

Note that the effects described herein are only examples, and the effects of the present technology are not limited to these effects. Effects other than those described in the present specification may also be obtained.

Note that the present technology can have the following configurations.

(1)

A solid-state imaging device including a pixel array unit in which a plurality of pixels is two-dimensionally arranged in a matrix, and a control unit that exposes all pixels of the pixel array unit at the same exposure timing and performs thinned read-out 2(N−1) times in which all the pixels are thinned to 1/N, so as to read electric charge in all the pixels of the pixel array unit, the electric charge being generated at the same exposure timing.

(2)

The solid-state imaging device according to (1), in which, in a case where N is an odd number, the control unit repeatedly performs reading at intervals of N rows in a vertical direction, so as to perform thinned read-out in which all the pixels are thinned to 1/N.

(3)

The solid-state imaging device according to (1) or (2), in which, in a case where N is an even number, the control unit alternately performs reading at intervals of (N−1) rows and reading at intervals of (N+1) rows in the vertical direction, so as to perform thinned read-out in which all the pixels are thinned to 1/N.

(4)

The solid-state imaging device according to (1) to (3), in which the control unit reads the same pixel row at an odd-numbered time among the thinned read-out of 2(N−1) times.

(5)

The solid-state imaging device according to (1) to (4), in which, every other one vertical scanning period, the control unit alternately performs reading of electric charge in a pixel row exposed at the same exposure timing and reading of electric charge in a pixel row repeatedly exposed at a predetermined frame rate.

(6)

The solid-state imaging device according to (1) to (5), in which the control unit repeats exposure at the predetermined frame rate on the same pixel row of the pixel array unit.

(7)

The solid-state imaging device according to (1) to (6), in which the pixel has a photoelectric conversion unit that generates electric charge by receiving and photoelectrically converting incident light, a first transfer transistor that transfers the electric charge generated by the photoelectric conversion unit, a first charge holding unit that holds the electric charge transferred from the photoelectric conversion unit by the first transfer transistor until a read-out timing, a second transfer transistor that transfers the electric charge held by the first charge holding unit at the read-out timing, and a second charge holding unit that holds the electric charge transferred from the first charge holding unit by the second transfer transistor.

(8)

A method for driving a solid-state imaging device including, by the solid-state imaging device including a pixel array unit in which a plurality of pixels is two-dimensionally arranged in a matrix exposing all pixels of the pixel array unit at the same exposure timing and performing thinned read-out 2(N−1) times in which all the pixels are thinned to 1/N, so as to read electric charge in all the pixels of the pixel array unit, the electric charge being generated at the same exposure timing.

(9)

An electronic apparatus including a solid-state imaging device including a pixel array unit in which a plurality of pixels is two-dimensionally arranged in a matrix, and a control unit that exposes all pixels of the pixel array unit at the same exposure timing and performs thinned read-out 2(N−1) times in which all the pixels are thinned to 1/N, so as to read electric charge in all the pixels of the pixel array unit, the electric charge being generated at the same exposure timing.

(10)

The electronic apparatus according to (9), further including a signal processing unit that causes a display unit to display image data at an odd-numbered time and performs processing of causing a recording medium to record image data at an even-numbered time, both the image data being among image data supplied from the solid-state imaging device by the thinned read-out of 2(N−1) times.

REFERENCE SIGNS LIST

1 Imaging device
12 Operation unit
13 Control unit
14 Solid-state imaging device
15 Signal processing unit
16 Recording unit
17 Display unit
51 Pixel
52 Pixel array unit
53 Vertical drive circuit
71 Photodiode
72 First transfer transistor
73 Memory unit (MEM)
74 Second transfer transistor
75 FD
76 Reset transistor
77 Amplification transistor
78 Selection transistor

The invention claimed is:

1. A solid-state imaging device comprising:
a pixel array unit in which a plurality of pixels is two-dimensionally arranged in a matrix; and
a control unit that exposes all pixels of the pixel array unit at a same exposure timing and performs thinned read-out 2(N−1) times in which all the pixels are thinned to 1/N, so as to read electric charge in all the pixels of the pixel array unit, the electric charge being generated at the same exposure timing.

2. The solid-state imaging device according to claim 1,
wherein, in a case where N is an odd number, the control unit repeatedly performs reading at intervals of N rows in a vertical direction, so as to perform thinned read-out in which all the pixels are thinned to 1/N.

3. The solid-state imaging device according to claim 1,
wherein, in a case where N is an even number, the control unit alternately performs reading at intervals of (N−1) rows and reading at intervals of (N+1) rows in the vertical direction, so as to perform thinned read-out in which all the pixels are thinned to 1/N.

4. The solid-state imaging device according to claim 1,
wherein the control unit reads a same pixel row at an odd-numbered time among the thinned read-out of 2(N−1) times.

5. The solid-state imaging device according to claim 1,
wherein, every other one vertical scanning period, the control unit alternately performs reading of electric charge in a pixel row exposed at the same exposure timing and reading of electric charge in a pixel row repeatedly exposed at a predetermined frame rate.

6. The solid-state imaging device according to claim 5, wherein the control unit repeats exposure at the predetermined frame rate on a same pixel row of the pixel array unit.

7. The solid-state imaging device according to claim 1, wherein the pixel has
a photoelectric conversion unit that generates electric charge by receiving and photoelectrically converting incident light,
a first transfer transistor that transfers the electric charge generated by the photoelectric conversion unit,
a first charge holding unit that holds the electric charge transferred from the photoelectric conversion unit by the first transfer transistor until a read-out timing,
a second transfer transistor that transfers the electric charge held by the first charge holding unit at the read-out timing, and
a second charge holding unit that holds the electric charge transferred from the first charge holding unit by the second transfer transistor.

8. A method for driving a solid-state imaging device comprising, by the solid-state imaging device including a pixel array unit in which a plurality of pixels is two-dimensionally arranged in a matrix:
exposing all pixels of the pixel array unit at a same exposure timing and performing thinned read-out 2(N−1) times in which all the pixels are thinned to 1/N, so as to read electric charge in all the pixels of the pixel array unit, the electric charge being generated at the same exposure timing.

9. An electronic apparatus comprising
a solid-state imaging device including
a pixel array unit in which a plurality of pixels is two-dimensionally arranged in a matrix, and
a control unit that exposes all pixels of the pixel array unit at a same exposure timing and performs thinned read-out 2(N−1) times in which all the pixels are thinned to 1/N, so as to read electric charge in all the pixels of the pixel array unit, the electric charge being generated at the same exposure timing.

10. The electronic apparatus according to claim 9, further comprising
a signal processing unit that causes a display unit to display image data at an odd-numbered time and performs processing of causing a recording medium to record image data at an even-numbered time, both the image data being among image data supplied from the solid-state imaging device by the thinned read-out of 2(N−1) times.

* * * * *